June 5, 1956

L. B. PERSON ET AL

DEVICE FOR AMPLIFICATION OF BOTH VOICE AND SIGNALLING VOLTAGES 2,749,394

Filed April 11, 1952

2 Sheets-Sheet 1

Inventors
L. B. Person
C. H. Von Sivers
K. R. Wadö
K. R. Wickman
By Glascock Downing & Seebold Attys.

INVENTORS
L. B. Person
C. H. Von Sivers
K. R. Wado
K. R. Wickman
BY Glascock Downing & Seebold
Attorneys.

United States Patent Office 2,749,394

Patented June 5, 1956

2,749,394

DEVICE FOR AMPLIFICATION OF BOTH VOICE AND SIGNALLING VOLTAGES

Lars Bernhard Person and Carl Henric Von Sivers, Stockholm, and Kurt Reid Wadö and Klas Rudolf Wickman, Hägersten, Sweden, assignors to Telefonaktiebolaget L M Ericsson, Stockholm, Sweden, a company of Sweden Application April 11, 1952, Serial No. 281,931

Claims priority, application Sweden April 24, 1951

4 Claims. (Cl. 179—171)

This invention relates to a device for radio or telephony purposes and concerns amplification of voltages above a certain frequency, in the following called voice voltages, and voltages below said frequency, e. g. signalling voltages of different kinds as dialling impulses, ring signals, busy signals, etc., in the following called signalling voltages, which latter generally have such a low frequency that they may actuate relays.

In order to decrease the influence of varying data of a tube, negative feedback is usually applied to it. Thereby it will be difficult for a signalling voltage, applied to the control grid of the tube, to be able to cause sufficient current variations through the tube so that a relay, which is inserted in the anode circuit of the tube, may switch on and off with such a good clearance which is necessary in the telephone technics.

This invention relates to a device with an electron tube for amplification of both voice and signalling voltages, in which device negative feedback is applied to the electron tube during amplification of voice voltages, but this feedback during amplification of signalling voltages automatically is switched off at a certain amplitude level, positive and/or negative, so that there will be a great change of the current through the electron tube.

Figure 1:
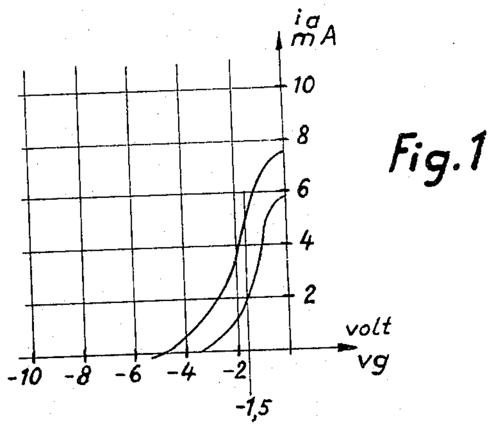

The invention will be described in detail in connection with the accompanying drawing wherein Fig. 1 shows a $i_a v_g$-diagram and Figs. 2–6 show some different embodiments according to the invention.

Fig. 1 shows a $i_a v_g$-diagram where the $i_a v_g$-characteristics are drawn for two tubes of the same kind. It may be seen that the same kind of tubes may have very different values of the anode current at the same grid voltage. E. g. according to the diagram one tube may have an anode current of 2 ma. and the other 5 ma. at a grid voltage of —1.5 volts. At a grid voltage of 0 volt (the grid is supposed to have a very high impedance to ground) one tube may have an anode current of 5.5 ma. and the other 7.5 ma. At a grid voltage of —3.5 volts one tube is cut-off while the other has an anode current of 1 ma. Finally the tubes may have different data in the beginning, secondly the transconductance of a tube which has been used for some time may have decreased largely below the initial value.

Figure 2:
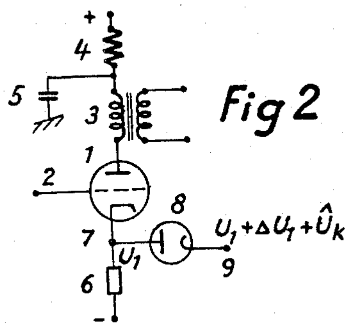

A device for telephony purposes ought to be able to function with a good clearance despite variations of the data of the tube. Fig. 2 shows a device according to the invention, where the said condition is realized. 1 is an electron tube, to the control grid of which a voice voltage is applied. This voice voltage is amplified by the tube and is taken out via the transformer 3 in the anode circuit of the tube to a utilizing circuit, e. g. a telephone. In series with the primary winding of the transformer 3 there is a relay winding 4, which is decoupled to ground by means of a condenser 5, the reactance of which is low for voice frequencies but high for signalling frequencies. The tube has a strong current feedback in the way that the cathode is connected to a large negative voltage via a large resistance 6. Thereby the current through the tube will be very constant and relatively independent of the data of the tube. The anode of a diode 8 is connected to the cathode 7 of the tube, while the cathode of the diode is connected to a bias 9 which has a low impedance to ground, the voltage of said bias being $U_1+\Delta U_1+\hat{U}_k$, where $U_1$ is the potential of the cathode 7 of the tube with no signal input to the control grid, $\Delta U_1$ is the maximum variations of this potential with different examples of the same kind of tube and with maximum permitted decrease of the data of the tube during their lives, and $\hat{U}_k$ is the maximum peak voltage of the voice voltage amplitude at the cathode 7 of the tube 1. By amplification of voice voltages the resistance of the diode remains high. If such a high positive signalling voltage is applied to the grid, that the cathode 7 will get a higher potential than the cathode of the diode 8, the diode will get a low resistance. By this we will get a low resistance to ground from the cathode 7 of the tube via the foward resistance of the diode and the bias connected to the cathode of the diode, the bias source having a low internal resistance. By this the tube 1 will get no negative feedback and because of this its anode current will increase very much. As a result of this the relay 10 in the anode circuit of the tube 1 will be actuated.

Figure 3:
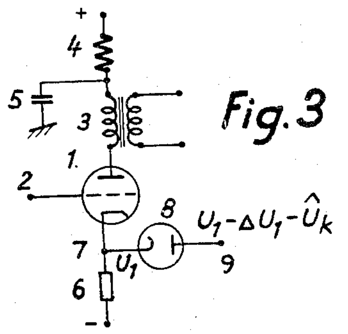

Fig. 3 shows another embodiment according to the invention. Here the cathode of the diode 8 is connected to the cathode of the tube 1, while the anode of the diode is connected to a point 9, the potential of which is $U_1-\Delta U_1-\hat{U}_k$ with definitions according to the preceding. When voice voltages are applied to the grid 2 the diode has a high resistance. Thus these voice voltages are amplified with a great negative feedback. The relay 4 is dimensioned to be normally closed. If such a great negative signalling voltage is applied to the grid, that the potential of the cathode 7 will drop below the potential of point 9, the diode will get a low resistance, resulting in a low resistance to ground from the cathode 7 of the tube. The low resistance to ground of the cathode 7 causes its potential not to decrease appreciably below the potential of the point 9. When the grid potential decreases further the cathode current of the tube is effectively cut off, whereby the relay will release with a good clearance.

In devices according to the above positive respectively negative signalling voltage must, however, have a greater amplitude than those of the voice voltages. If, namely, the amplitudes of the voice voltages would be equally great as those of the signalling voltages, then the diode 8 would get a low resistance during either the positive or the negative peaks resulting in distortion of the voice voltages. In certain cases signalling by the help of a signalling voltage of the same amplitude as the maximum amplitude of the voice voltages is wanted. This may be brought about by the devices according to Figs. 4 or 5.

Figure 4:
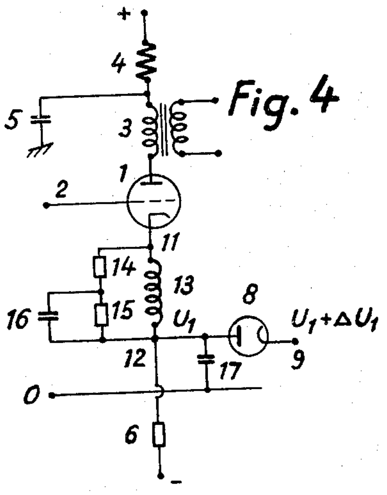

In Fig. 4 the amplifier tube 1 has a great negative feedback caused by the high resistance 6 like the previous embodiments. Between the cathode 11 of the tube and a point 12, which is connected to the resistance 6, there is applied a feedback network in order to adjust the frequency response of the amplifier in a wanted way. This network may be designed in many different ways but here it consists of a coil 13, shunted by two resistances 14 and 15, which are connected in series to each other. The resistance 15 is shunted by a condenser 16. For the application of the invention the network ought to have a low impedance for signalling frequencies but a high impedance for voice frequencies. In this network this is made possible by the help of the coil 13. Further point 12 is connected to ground through a condenser 17, the reactance of which ought to be low for voice frequencies. Furthermore the anode of a diode 8 is connected to point 12 and the cathode of said diode is connected to point 9 the bias of which is $U_1+\Delta U_1$, where $U_1$ is the potential of point 12 and $\Delta U_1$ is the maximum variation of this potential with regard to different examples of the tubes, the data of which may have changed more or less during the life of the tube. A voice voltage, applied to the grid 2, is amplified by the tube with negative feedback and applied to the transformer 3. As point 12 is decoupled to ground via the condenser 17, there will be no alternating voltage in point 12. Therefore the back voltage of the diode need be only $\Delta U_1$ as again $\Delta U_1+\hat{U}_k$ in a device according to Figs. 2 and 3. If a positive signalling voltage is applied to the grid the current through the tube will increase. Hereby the condenser 17 will be charged and in the beginning of the charging time point 12 has a low impedance to ground. When the condenser is charged to such an extent that the potential of point 12 will exceed the potential of point 9, the diode will get a low resistance resulting in point 12 still having a low impedance to ground. Because the inductance 13 of the frequency correcting network has a low impedance for signalling frequencies, the whole cathode impedance of the tube will be low for signalling frequencies, the negative feedback will disappear almost totally and the anode current variations will be enough for the relay to switch on or off with good clearance.

Figure 5:
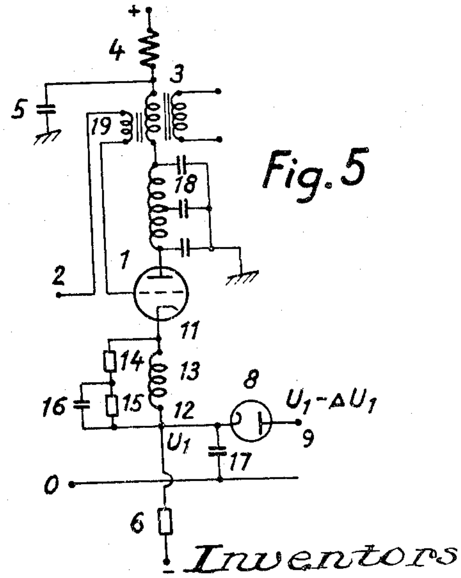

In Fig. 5 there is shown a device similar to that of Fig. 4 but here the diode 8 has been reversed so that its cathode is connected to point 12 and its anode to point 9, the bias of which is $U_1-\Delta U_1$. The diode has a high impedance when voice voltages are applied to the grid. If a negative signalling voltage is applied to the grid, the current through the tube will decrease. This change of the current will cause the condenser 17 to be discharged, whereby the potential of point 12 will drop below the potential of point 9 giving the diode a low impedance. Here too the negative feedback will disappear almost totally for signalling voltages and the anode current variations will be enough for the relay to switch off or on with good clearance.

In Fig. 5 a low pass filter 18 has been inserted in the anode circuit. By another secondary winding 19 of the output transformer 3 voltage feedback may be obtained. By suitable combination of voltage and current feedback it is possible to obtain matching of the output impedance of the tube 1 to the filter 18, which makes a smoother frequency curve possible.

The devices according to Figs. 2 and 3 may be combined in such a way that to the cathode 7 of the amplifier tube 1 there are connected both the anode of a first diode and the cathode of a second diode. The cathode of the first diode is connected to a bias, the potential of which is $U_1+\Delta U_1+\hat{U}_k$ with definitions according to the preceding, whereby the bias source has a low impedance to ground. The anode of the second diode is connected to another bias source, the potential of which is $U_1-\Delta U_1-\hat{U}_k$, whereby this bias source also has a low impedance to ground. Such a device will function in such a way that the said first diode will get a low resistance at a certain positive amplitude level and the other diode will get a low resistance at a certain negative amplitude level, when the first-mentioned diode is conducting the cathode potential will be locked at the value $U_1+\Delta U_1+U_k$ and cannot consequently increase any more. The cathode current of the tube is therefore considerably increased. When the second-mentioned device is conducting the cathode potential will be locked at the value $U_1-\Delta U_1-U_k$ and the cathode current of the tube is thus effectively cut off.

Figure 6:
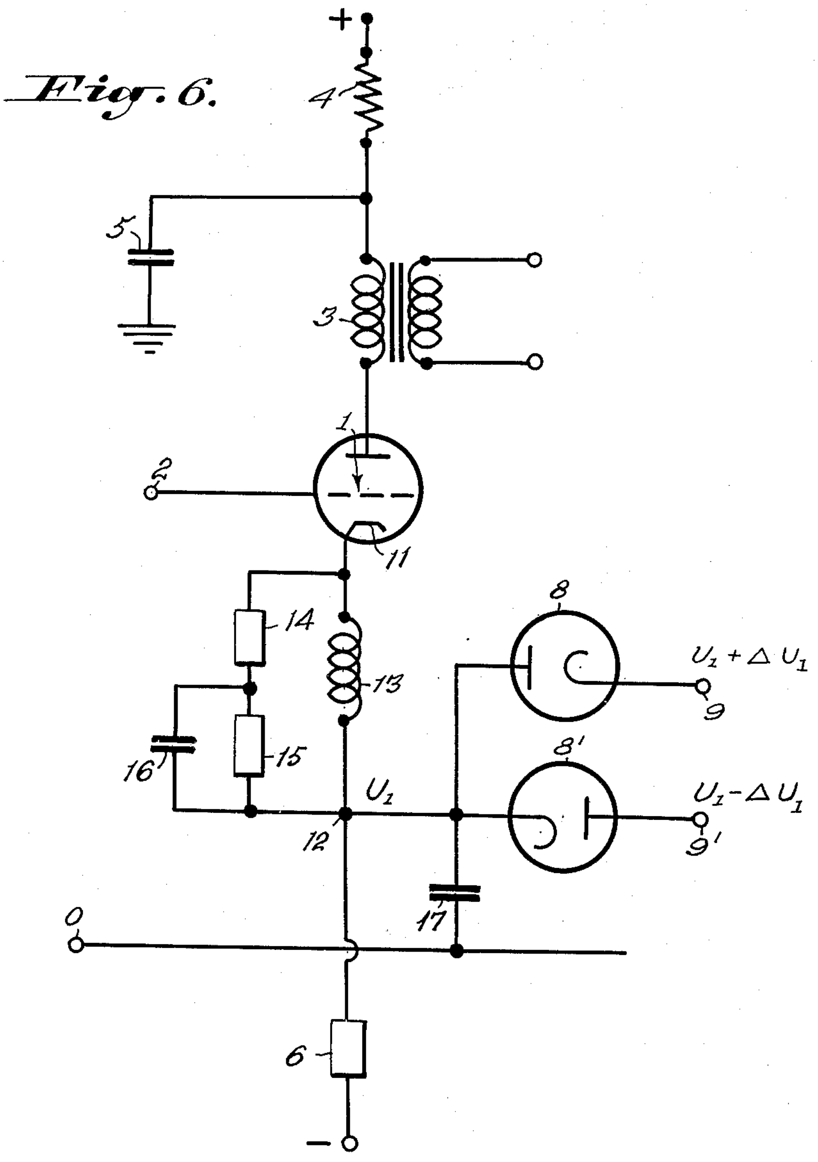

In the same way the devices according to Figs. 4 and 5 may be combined as shown in Fig. 6, which figure is the same as Fig. 4 except that to point 12 there are connected both the anode of a first diode 8 and the cathode of a second diode 8'. The cathode of the first diode 8 is connected to a bias source 9, the potential of which is $U_1+\Delta U_1$, with definitions according to the preceding and which bias source has a low impedance to ground. The anode of the second diode 8' is connected to another bias of source 9', the potential of which is $U_1-\Delta U_1$ and which bias source also has a low impedance to ground. Such a device will function in such a way that the said first diode 8 will get a low resistance at a certain positive amplitude level of the signalling voltages, and the other diode 8' will get a low resistance at a certain negative amplitude level of the signalling voltages, whereby in these cases the negative feedback will disappear atuomatically, resulting in a great amplification.

The diodes 8 and 8' may be vacuum tube diodes, crystal diodes or dry rectifiers. The tube 1 has in the figures been drawn as a triode, but of course it may as well be a multiple grid tube, e. g. a pentode.

We claim:

1. In a device for the amplification of voltages above a given frequency, an eelctron tube, a cathode in said tube, a feedback network having a high impedance for voice voltages and a low impedance for voltages of a lower frequency connected at one end to said cathode, a source of high negative voltage, a circuit connecting said source to the other end of said network, a resistance in said circuit having a value so great that the direct current of the tube is held approximately constant, a condenser having an impedance which is low for voice voltages but high for signalling voltages connected to the said other end of said network and to ground, a biasing voltage source, a diode connected directly between the biasing voltage source and the said other end of said network.

2. In a device according to claim 1, wherein the electron tube is provided with an anode circuit, a band pass filter in said anode circuit, and the current feedback being arranged in such proportions that the internal resistance of the tube is brought to be matched to said filter in amplification of voice voltages.

3. In a device for the amplification of voltages above a given frequency, an electron tube, a cathode in said tube, a feedback network having a high impedance for voltages of a lower frequency connected at one end to said cathode, a source of high negative voltage, a circuit connecting said source to the other end of said network, a resistance in said circuit having a value so great that the direct current of the tube is held approximately constant, a condenser having an impedance which is low for voice voltages but high for signalling voltages connected to the said other end of said network and to ground, the anode of a first diode and the cathode of a second diode being connected to the said other end of said network, the cathode of the first diode being directly connected to a first biasing source and the anode of the second diode being directly connected to a second biasing source, the potential of said first biasing source being greater than that of the second biasing source.

4. In an amplifying system a multielectrode tube having at least an anode grid and cathode, a feedback network connected at one end thereof to the cathode, said network having a low impedance for signalling frequencies and a high impedance for voice frequencies, a source of high negative voltage, a resistor connected between said source and the other end of said network, said resistor having a value sufficient to develop a feedback voltage to stabilize the tube current, a condenser having a low reactance for voice frequencies connected between the said other end of said network and ground, a diode having the cathode thereof connected to the said other end of said network, the anode of said diode connected to a source of bias voltage, said source being no greater than the cathode potential with no signal input to the grid whereby upon condenser charging and application of negative signalling voltage to the grid the tube current will decrease to discharge the said condenser and cause the diode to conduct to eliminate the feedback voltage.

References Cited in the file of this patent

UNITED STATES PATENTS

| | | |
|---|---|---|
| 2,215,777 | Benz | Sept. 24, 1940 |
| 2,222,933 | Blumlein | Nov. 26, 1940 |
| 2,273,432 | Brewer | Feb. 17, 1942 |
| 2,296,626 | Blumlein | Sept. 22, 1942 |
| 2,428,363 | Elmendorf | Oct. 7, 1947 |
| 2,529,459 | Pourciau et al. | Nov. 7, 1950 |
| 2,548,901 | Moe | Apr. 17, 1951 |